United States Patent Office.

BENNO HOMOLKA, OF FRANKFORT-ON-THE-MAIN, AND AUGUST STOCK, OF HÖCHST-ON-THE-MAIN, GERMANY, ASSIGNORS TO THE FARBWERKE, VORMALS MEISTER, LUCIUS & BRÜNING, OF HÖCHST-ON-THE-MAIN, GERMANY.

NITROBENZYLANILIN SULFONIC ACID AND PROCESS OF MAKING SAME.

SPECIFICATION forming part of Letters Patent No. 648,261, dated April 24, 1900.

Application filed December 15, 1897. Serial No. 662,028. (Specimens.)

*To all whom it may concern:*

Be it known that we, BENNO HOMOLKA, doctor of philosophy, a citizen of the Empire of Austria-Hungary, residing at Frankfort-on-the-Main, and AUGUST STOCK, doctor of philosophy, a citizen of the Empire of Germany, residing at Höchst-on-the-Main, Germany, have invented certain new and useful Improvements in the Manufacture of Ortho and Para Nitrobenzylanilin Sulfonic Acids and their Homologues, (for which we have obtained Letters Patent in England, No. 15,890, dated July 3, 1897, and in France, No. 260,329, dated October 10, 1896,) of which the following is a description.

This invention relates to the production of ortho- and para-nitrobenzylanilin and its homologues.

We have found that by the action of ortho- or para-nitrobenzylchlorid upon the sulfonic acids of anilin and its homologues in the presence of fixed alkali, alkali corbonate or acetate, or alkaline earths or ammonia the nitrobenzylanilin, sulfonic acids or their homologues corresponding to the simplest typical formula may easily be obtained with a good yield:

$$NO_2 - C_6H_4 - CH_2 - NH . C_6H_4 - SO_3H$$
Nitro — benzyl — anilin — sulfoacid.

according to the following chemical equations:

1. $C_6H_4 \begin{Bmatrix} CH_2.Cl \\ NO_2 \end{Bmatrix} + C_6H_4 \begin{Bmatrix} NH_2 \\ SO_3.Na \end{Bmatrix} + NaOH =$
Nitrobenzylchlorid, Anilinsulfonic acid, Sodium
(ortho- or para-.)   (sodium salt.)   hydroxid.

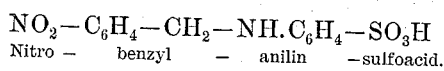

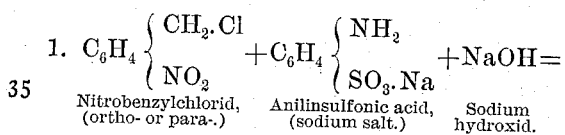

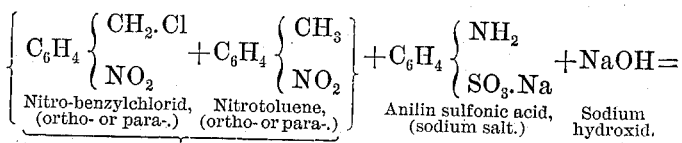

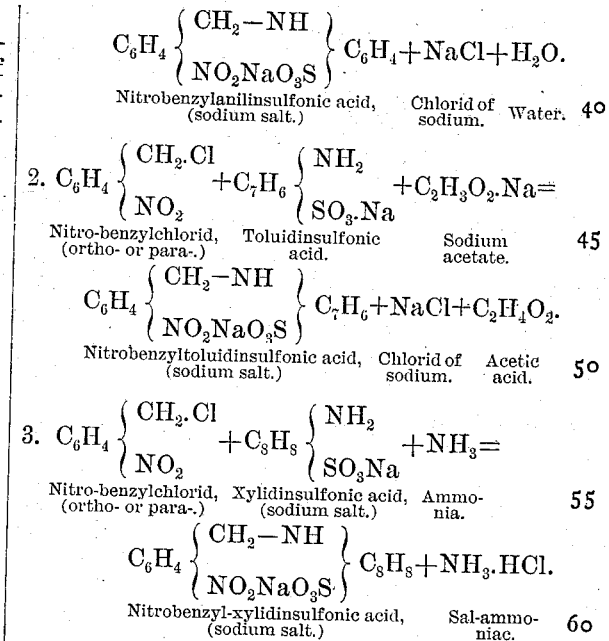

$C_6H_4 \begin{Bmatrix} CH_2 - NH \\ NO_2NaO_3S \end{Bmatrix} C_6H_4 + NaCl + H_2O.$
Nitrobenzylanilinsulfonic acid, Chlorid of Water.
(sodium salt.)   sodium.

2. $C_6H_4 \begin{Bmatrix} CH_2.Cl \\ NO_2 \end{Bmatrix} + C_7H_6 \begin{Bmatrix} NH_2 \\ SO_3.Na \end{Bmatrix} + C_2H_3O_2.Na =$
Nitro-benzylchlorid, Toluidinsulfonic Sodium
(ortho- or para-.)   acid.   acetate.

$C_6H_4 \begin{Bmatrix} CH_2 - NH \\ NO_2NaO_3S \end{Bmatrix} C_7H_6 + NaCl + C_2H_4O_2.$
Nitrobenzyltoluidinsulfonic acid, Chlorid of Acetic
(sodium salt.)   sodium.   acid.

3. $C_6H_4 \begin{Bmatrix} CH_2.Cl \\ NO_2 \end{Bmatrix} + C_8H_8 \begin{Bmatrix} NH_2 \\ SO_3Na \end{Bmatrix} + NH_3 =$
Nitro-benzylchlorid, Xylidinsulfonic acid, Ammonia.
(ortho- or para-.)   (sodium salt.)

$C_6H_4 \begin{Bmatrix} CH_2 - NH \\ NO_2NaO_3S \end{Bmatrix} C_8H_8 + NH_3.HCl.$
Nitrobenzyl-xylidinsulfonic acid, Sal-ammoniac.
(sodium salt.)

The nitrobenzylchlorids requisite for our process may be employed as such in a pure state or in form of such mixtures of nitrobenzylchlorid and nitrotoluene as are easily obtained by partial chlorination of the nitrotoluenes at a higher temperature. If one operates, for instance, in the latter case, with such a mixture containing nitrobenzylchlorid and nitrotoluene in about molecular proportions, the above equation (1) undergoes the following change:

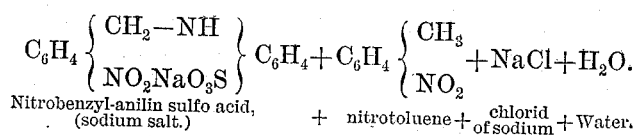

$C_6H_4 \begin{Bmatrix} CH_2 - NH \\ NO_2NaO_3S \end{Bmatrix} C_6H_4 + C_6H_4 \begin{Bmatrix} CH_3 \\ NO_2 \end{Bmatrix} + NaCl + H_2O.$
Nitrobenzyl-anilin sulfo acid, + nitrotoluene + chlorid of sodium + Water.
(sodium salt.)

The thus-regenerated nitrotoluene may easily be separated as the only constituent of the product of reaction which is insoluble in water. We proceed, for instance, as follows:

*I.—Manufacture of nitrobenzylanilinsulfonic acids and their homologues from pure nitrobenzylchlorid.*—In a vessel provided with an agitator and an inverted condenser 17.1 kilos of nitrobenzylchlorid (ortho- or para-) are heated with a solution of twenty kilos anilinsulfonate of sodium and 5.3 kilos of anhydrous sodium carbonate in about one hundred liters of water, while stirring well to 60° to 100° centigrade until the nitrobenzylchlorid has completely disappeared. The yellow-colored solution containing the sodium salt of the nitrobenzylanilin sulfonic acid is mixed with a diluted mineral acid, whereupon the nitrobenzylanilinsulfonic acid separates partly already in the heat and completely in the cold as a yellowish crystalline powder.

*II.—Manufacture of the nitrobenzylanilinsulfonic acids and their homologues from the mixtures of nitrobenzylchlorid and nitrotoluene obtained by partial chlorination of nitrotoluenes at a higher temperature.*—A vessel similar to that of the previous example is, for instance, filled with 34.2 kilos of a mixture of about equal parts of nitrobenzylchlorid (ortho- or para-) and nitrotoluene (ortho- or para-) as is obtained by partial chlorination of nitrotoluene (ortho- or para-) and twenty kilos of anilinsulfonate of sodium and 5.3 kilos of anhydrous sodium carbonate dissolved in about one hundred liters of water. The whole is brought to boil for some hours, when the nitrobenzylchlorid, as in Example I, combines with the anilinsulfonate salt and is dissolved, while the nitrotoluene remains behind undissolved and may be removed by means of a tap or a siphon. The remaining yellow aqueous solution of the nitrobenzylanilinsulfonate salt is now treated exactly as in Example I.

In both of the above examples the anilinsulfonic acids may be substituted by the equivalent quantities of toluidinsulfonic acids, xylidinsulfonic acids, or naphthylaminsulfonic acids, and, further, may be substituted, as mentioned above, the sodium carbonate by the equivalent quantities of other fixed alkali, alkali carbonate or acetate, alkaline earths or ammonia.

The nitrobenzylanilinsulfonic acids and their homologues thus obtained are yellowish crystalline powders little soluble in cold water, more readily soluble in hot water, soluble with great difficulty in alcohol, insoluble in ether, benzene, toluene, xylene, chloroform, and ligroin, and soluble in dilute alkalies with a yellowish color.

The new compounds serve for the manufacture of nitrobenzaldehyde as required in the anilin-dye industry.

Having now described our invention, what we claim is—

1. The herein-described process of producing nitrobenzylanilinsulfonic acids, which consists in heating nitrobenzylchlorid, where the nitro group is in ortho- or para- position, with an aqueous solution of a salt of anilinsulfonic acid in the presence of alkaline substances, substantially as described.

2. As a new product, nitrobenzylanilinsulfonic acid, where the nitro group is in ortho- or para- position, the same being a yellow powder, little soluble in cold, more soluble in hot water, soluble with great difficulty in alcohol, insoluble in benzene, toluene, xylene, ether, chloroform and ligroin, and soluble in dilute alkalies with a yellow color, substantially as described.

In testimony that we claim the foregoing as our invention we have signed our names in presence of two subscribing witnesses.

BENNO HOMOLKA.
AUGUST STOCK.

Witnesses:
HEINRICH HAHN,
ALFRED BRISBOIS.